US006734883B1

(12) United States Patent
Wynn et al.

(10) Patent No.: US 6,734,883 B1
(45) Date of Patent: May 11, 2004

(54) SPINLIST GRAPHICAL USER INTERFACE CONTROL WITH PREVIEW AND POSTVIEW

(75) Inventors: Allen C. Wynn, Round Rock, TX (US); Cristi N. Ullmann, Austin, TX (US); Michael W. Brown, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/579,257

(22) Filed: May 25, 2000

(51) Int. Cl.[7] .................................................. G09G 5/00
(52) U.S. Cl. ..................... 345/830; 345/808; 345/809; 345/818; 345/856
(58) Field of Search ................................. 345/810, 783, 345/829, 828, 825, 820, 819, 818, 817, 784, 830, 833, 835, 786, 808, 809, 856, 859

(56) References Cited

U.S. PATENT DOCUMENTS

| 4,879,648 | A | * | 11/1989 | Cochran et al. ............ 345/841 |
| 5,363,481 | A | * | 11/1994 | Tilt ............................ 345/814 |
| 5,721,847 | A | | 2/1998 | Johnson |
| 5,790,115 | A | | 8/1998 | Pleyer et al. |
| 5,844,560 | A | | 12/1998 | Crutcher et al. |
| 6,144,378 | A | * | 11/2000 | Lee ............................. 345/767 |
| 6,295,057 | B1 | * | 9/2001 | Rosin et al. ................ 345/744 |
| 6,300,967 | B1 | * | 10/2001 | Wagner et al. ............. 345/784 |
| 6,388,686 | B1 | * | 5/2002 | Hetherington et al. ...... 345/810 |

OTHER PUBLICATIONS

Hoffman, John. "Glossary Applet" source code, ©1998, Sun Microsystems, Inc. p. 1.*
The Glossary Applet by Sun Microsystems, Java Boutique, Aug. 3, 1998, http://javaboutique.internet.com/Glosary/.*
Examiners Automated Search Tool, v 1.03.0007, US Patents Trademarks Office, ©1999.*

* cited by examiner

*Primary Examiner*—John Cabeca
*Assistant Examiner*—Shawn Becker
(74) *Attorney, Agent, or Firm*—Robert H. Frantz; David A. Mims, Jr.

(57) ABSTRACT

A GUI control for entering a user selection from a list of possible selections in which the user can "spin" through a list of items shown on preview and postview option lists. The control allows the user to spin forwards and backwards, with a preview list of items and a postview list of items being displayed on opposing sides of the currently selected item dialog box. By providing visibility to the upcoming and recently past selections during the spin, a user can operate the spin control at a higher speed, thereby reducing the amount of time necessary to find the desired item on the list.

20 Claims, 7 Drawing Sheets

Figure 1 — Prior Art

SPINLIST GRAPHICAL USER INTERFACE CONTROL WITH PREVIEW AND POSTVIEW

CROSS-REFERENCE TO RELATED APPLICATIONS

This application is related to U.S. application Ser. No. 09/578,748, agent docket number AUS000201US1, filed May 25, 2000, by Cristi N. Ullmann, et al., which is commonly assigned.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related application, docket number AUS000201US1, now application number 09/578,748, filed on May 25, 2000 by Cristi N. Ullmann, et al., is incorporated herein by reference in its entirety, including drawings, and hereby are made a part of this application.

BACKGROUND OF THE INVENTION

1. Field of the Invention

This invention relates to the arts of graphical user interface controls provided on computer displays, and to related displays such as personal digital assistants ("PDA") and wireless communications devices.

2. Description of the Related Art

Graphical user displays on electronic devices such as computers, personal digital assistants, and wireless communications devices are common in the art. As these devices become more and more integral to activities in the daily lives of people such as web browsing, word processing, and even making telephone calls, the efficiency and ergonomics of these interfaces are extremely important. A user will quickly notice whether one user interface is easier and quicker to use than another based upon the number of operations required to perform a certain task. Further, the level of "intuitiveness" implemented in the user interface can greatly increase the usefulness and speed with which the user can operate the device.

Many graphical user interfaces follow the same conventions for navigation of and selection of controls on the users interface. Such common graphical user interfaces ("GUI") include windows or frames-type displays in Microsoft's Windows operating system, Unix operating system, IBM's OS/2 and AIX operating systems, Microsofts Windows CE operating system, Apple Computer's operating system, and many "proprietary" windows-like GUI's on various devices such as PDA's, cell phones, electronic organizers, etc.

FIG. 1 shows the basic organization of many prior art computer systems and computer-based devices. The system (10) typically includes a microprocessor central unit ("CPU") including computer memory, may also include interfaces to hard disks and removable disk media (14), and possibly interfaces (17) to computer or communications networks (11) such as a network interface card ("NIC") or wireless communications interface. Commonly used NICs include EtherNet local area network ("LAN") cards, dial-up modem cards, and wireless communications circuits. Some of these circuits may be provided integral to the device (10), such as the case with web-enabled cell phones, or these circuits may be available as option circuits such as PCI cards PCMCIA cards for personal computers.

Additional typical hardware provided in the system (10) includes a group of user input/output ("I/O") devices (13), such as a display, keyboard, and/or pointing device, accompanied by common user I/O interface circuits to allow the CPU and system software to access and use the user I/O devices (13). Common display devices include VGA and LCD monitors for personal computers, and LCD panels for PDA and cell phones. Common pointing devices include "arrow keys", "tab" keys, mouse and scroll-mouse, joystick, track balls, glide point touch sensitive pads, and touch sensitive displays with stylus pens. Some devices, such as certain PDA's, do not include an actual keyboard, but rather rely upon a touch-sensitive LCD display with virtual pointing device and stylus.

The software functionally of computer-based systems (10) can be divided into low-level device drivers and BIOS (18), an operating system (103), a portable interpreter (19), and applications programs. Low-level device drivers provide hardware-specific interface functions which allow the operating system and application programs to access the system hardware through common or generic application program interfaces ("API"). Some device drivers include necessary communications protocols and methods associated with a particular hardware device, such as a modem or wireless communications interface. Application programs can be further divided into portable applications, or applets (101), and non-portable, system-dependent applications (102). Such division of hardware and software functionally is well-understood in the art, and can be applied to large computer systems such as an IBM AS/400 equally as well to small computer systems such as PDA's running Windows CE.

On the system display is typically shown a conventional frame or "window" of information related to a specific system function or program, such as a word processor, spreadsheet, to-do list, address book, e-mail client, or web browser. FIG. 2 shows a typical arrangement of a frame (20) including a title bar (21), tool bar (24), display area (25), and a pointer (201). The pointer (201) moves in response to the system pointing device and/or keyboard, such as typing on the arrow keys, movement of a mouse, track ball, or joystick. The title bar may include "buttons" for minimizing or restoring the frame (23), closing the program (22), as well as a display of the name of the function or program. The tool bar (24) typically includes a number of text and/or iconic options, such as "file" and "edit" drop-down lists.

The display area may be further navigable using vertical scroll (27) and horizontal scroll (26) bars, which are especially useful for system displays of information which cannot be shown completely within one frame on the display. "Clicking" on the right button (29) or left button (28), or "dragging" the horizontal position indicator (27) causes the information in the display area (25) to be panned or scrolled left or right. Likewise, using the up button (29), down button (28), or vertical position indicator (200) can cause panning or scrolling in a vertical motion. These types of scroll bars are common on word processors, spreadsheets, graphical design packages, and web browsers.

In typical operation of these types of GUI displays, the user moves the pointer (201) to a button or text option, and selects that option by clicking on it and/or dragging it. In some cases, keyboard-only navigation or selection is possible by using special combinations of keys, such as ALT-F to select the "file" drop-down menu.

A common type of GUI control is a selection list. FIG. 3 shows one type of a selection list called a drop-down list (30). This format of a selection list includes a label (31) indicating what the type of choice is, and a dialog box (32) showing the currently selected item from a list. Often, there is a drop-down button (33) associated with the control, which when operated by the user, causes the full list of options to be displayed. In some cases, the user may "click" into the dialog box (32) directly, and type in his or her choice, and in other cases, the entered item is constrained to be one of the items from the list.

FIG. 4 shows the first step in the operation of these common selection lists, in which the user positions the pointer (201) over the drop-down button (33). In most cases, the system requires the user to activate the button, such as a mouse click, but in some cases, the drop-down list (40) will be automatically displayed when the pointer is simply positioned over the drop-down button. The drop-down list (40) contains some list of options available for the user to select and make the new selection. For example in a web browser, the label (31) may be "Location", and the list (40) may include the last 20 universal resource locator ("URL") addresses visited. Or, in another example in a word processor, the label may be "Open File:", and the list may include the last 10 files opened and edited. In a further example on a PDA contact list function, the label may be "Contact info for:", and the list may include the names for the 10 persons' card files last viewed or edited.

FIG. 5 shows how the user may select an item for the list (40). Typically, this can be achieved through several actions, such as moving the pointer (201) over the item to be selected, or using the arrow or TAB keys to highlight the selection. The indicated item is typically highlighted by a color change, background change, or reverse-video effect. The user finalizes the selection by some other action, such as clicking or double-clicking with a mouse, or pressing an "ENTER" key on a keyboard. This causes the selected item on the list to replace the item in the dialog box, and provides the function or program with the input choice from the user, as shown in FIG. 6.

A similar GUI control is a spin list. A spin list's visual presentation is very similar to that of a drop-down list, but typically includes a forward and reverse button. As the user clicks on the forward or reverse button, the next or previous possible selection is displayed in the dialog box for possible confirmation and finalization as the new selection. This kind of spinner control is especially common in applications where the list may be prohibitively long to display on the actual display device.

Typically, both of these types of controls and their associated possible selection lists are "finite" in their length and in their operation. There is usually a maximum number of items which will be displayed in order to accommodate the physical size and resolution of the display device. Also, the user can usually highlight any item from top to bottom on the list, but must move the point up and down the entire range of the list to select an item.

As these types of drop-down lists are very useful for many types of controls for many types of system functions and programs, they have certain inherent limitations and problems. For example, the list of items may have to be very brief compared to the subject matter of the choice to be made. Such a case exists with web browser controls in which the user may want to "go to" a URL or address which was accessed several hundred accesses ago. Such a short, drop-down list may only show the last few accesses, which is not adequate. Or, as in the example of the PDA and the contact card list, the user may want to look at a certain list of names of contacts sorted in some order, such as alphabetical business contacts or most recently entered personal contacts. These problems are solved in one manner by the infinite spinlist GUI control described in the related application.

However, many user's of computers and computer-based devices which have GUI controls develop very quick sequences of keystrokes which they repeat often. For example, in a word processor such as Lotus WordPro, the function to save a file may be executed by clicking on the "File" drop down menu, followed by clicking on the "Save" choice on the drop-down list. A keyboard shortcut can also operate the same function by typing CONTROL-F, followed by an "S". Some user's of WordPro will develop the ability to activate this control in less than a second, in some cases. So, as user's become very familiar with a particular GUI for a particular function or program, they will start to activate certain often-used functions more quickly, which makes the GUI efficiency, or lack thereof, even more pronounced.

All of the GUI controls discussed thus far, including drop-down lists, spin lists, and infinite spinlists, can be difficult to operate rapidly due to the inability of a user to "scroll" through the available choices on a list and select a choice at the same speed as the computer can print the scrolling choices to the screen.

Therefore, there is a need in the art for a GUI control which allows a user to conveniently review a long list of possible selections, and to select one or more of those options as a system input, while scrolling through the list at a high speed. There is a further need in the art for this GUI control to efficiently utilize display space, as the amount of space available for each GUI control on a particular window or frame or on a particular device is usually limited.

BRIEF DESCRIPTION OF THE DRAWINGS

The following detailed description when taken in conjunction with the figures presented herein present a complete description of the present invention.

SUMMARY OF THE INVENTION

The invention provides a GUI control for entering a user selection from a list of possible selections in which the user can "spin" through a list of items. The control allows the user to spin forwards and backwards, with a preview list of items and postview list of items being displayed on opposing sides of the currently selected item dialog box. By providing visibility to the upcoming and recently past selections during the spin, a user can operate the spin control at a higher speed, thereby reducing the amount of time necessary to find the desired item on the list.

DETAILED DESCRIPTION OF THE INVENTION

The foregoing and other objects, features and advantages of the invention will be apparent from the following more particular description of a preferred embodiment of the invention, as illustrated in the accompanying drawings wherein like reference numbers represent like parts of the invention.

The invention is preferably realized as a user graphical interface control or dialog object integrated into a function or application program on a computer or computer-based system. The computer-based system is preferably provided with an operating system which provides common GUI control functions, such as pointer location and movement detection, event handling based upon areas on the display in which the pointer is located, and event handling of pointer selection such as mouse clicks. As such, the invention can be realized on personal computers, palm-top computers and personal digital assistants, as well as other devices incorporating graphical user displays such as cell phones and wireless web browsers.

Figure 1:
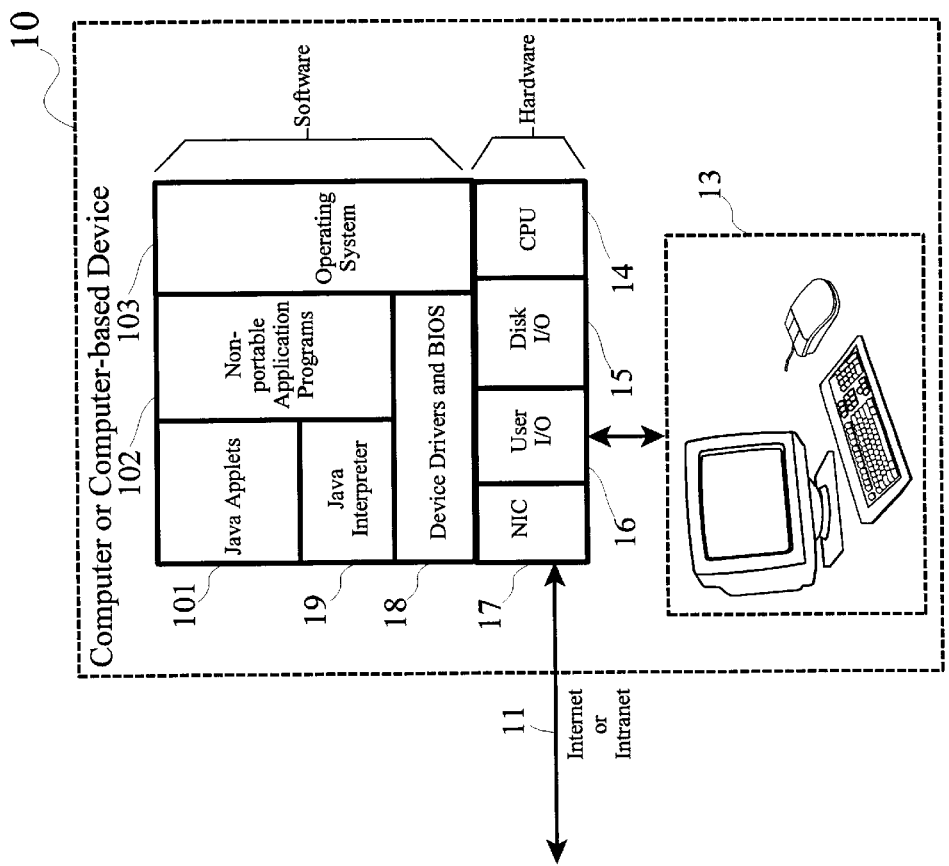
FIG. 1 shows the prior art arrangement of computers and computer-based devices with graphical user interfaces.
Figure 2:
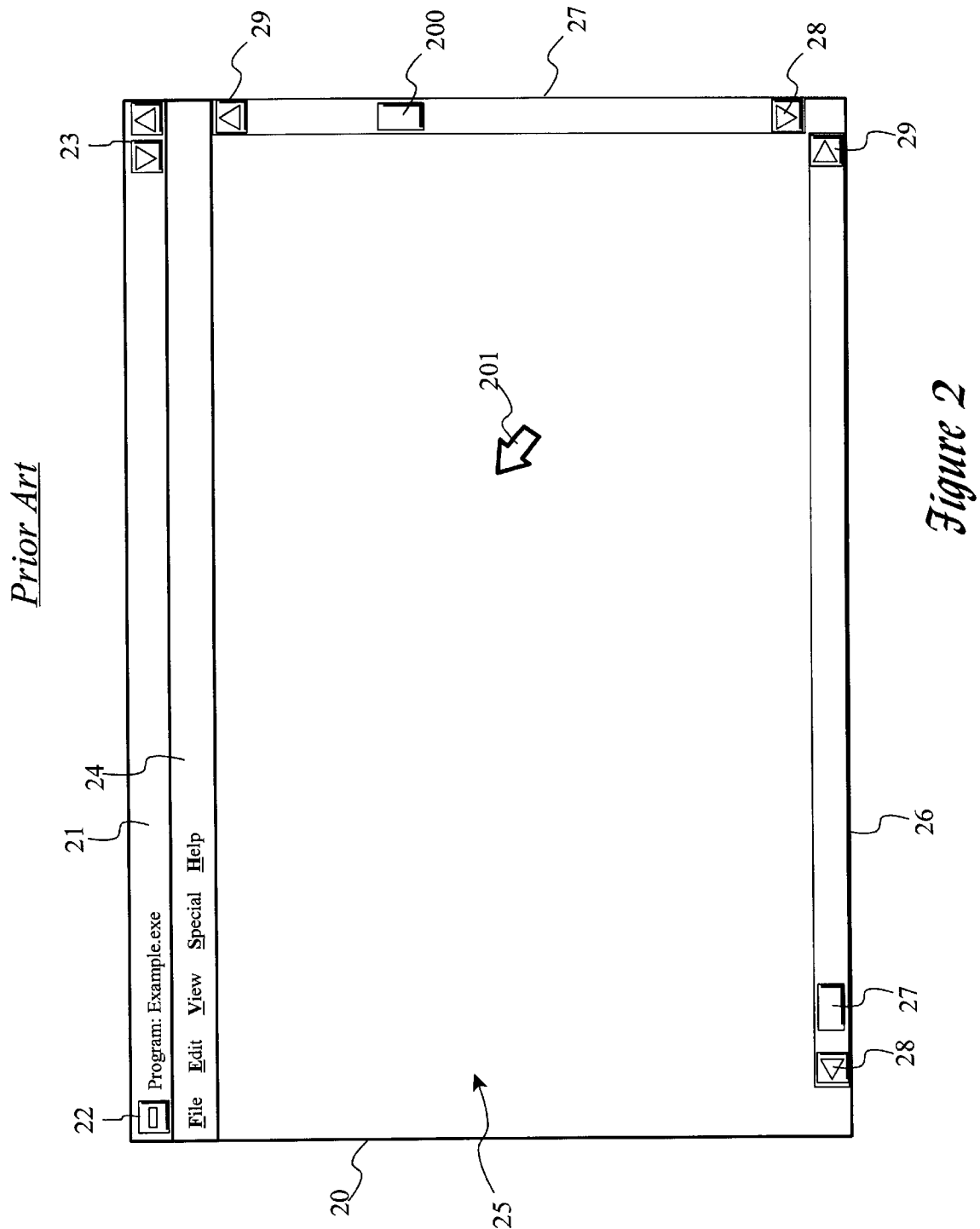
FIG. 2 presents an example GUI frame.
Figure 3:
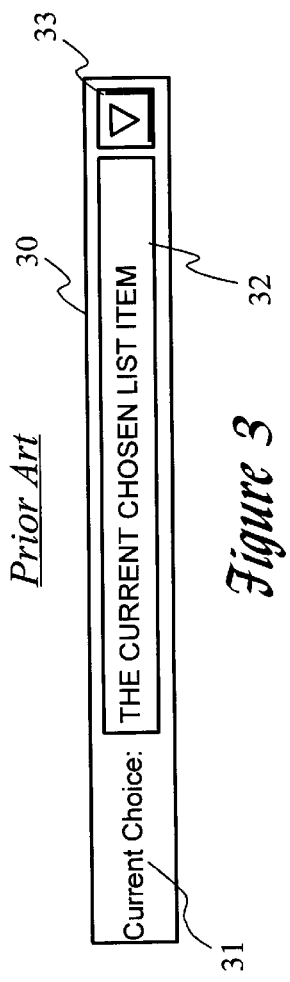
FIG. 3 illustrates an example drop-down list GUI control.
Figure 4:
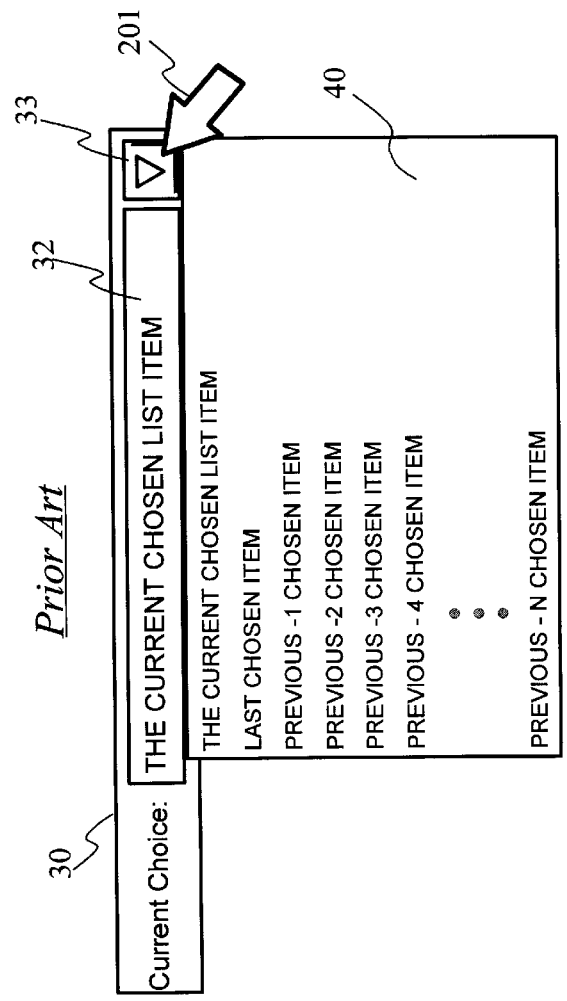
FIG. 4 shows a step in the operation of a drop-down list GUI control in which the list of selections is displayed.
Figure 5:
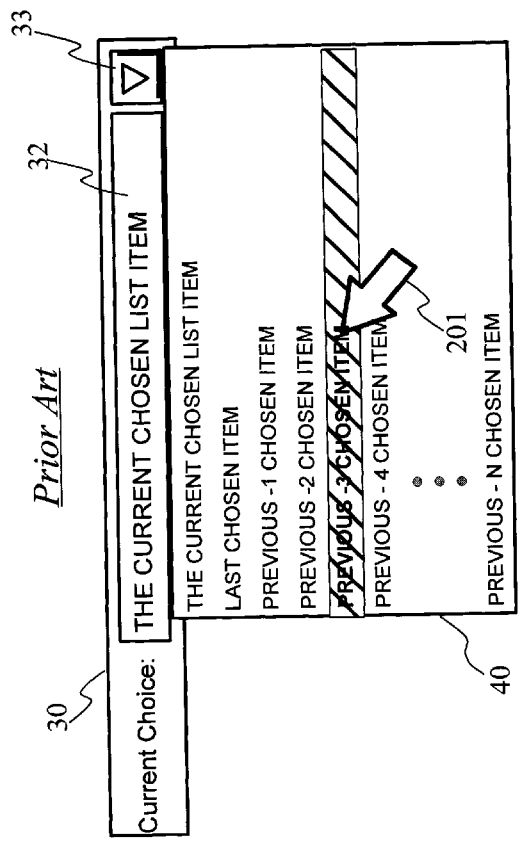
FIGS. 5 and 6 illustrate the steps of selecting an item from the list.
Figure 6:
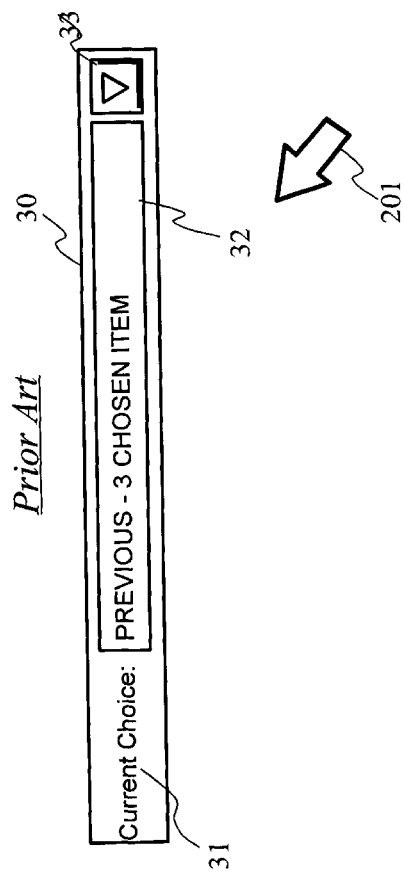
Figure 7:
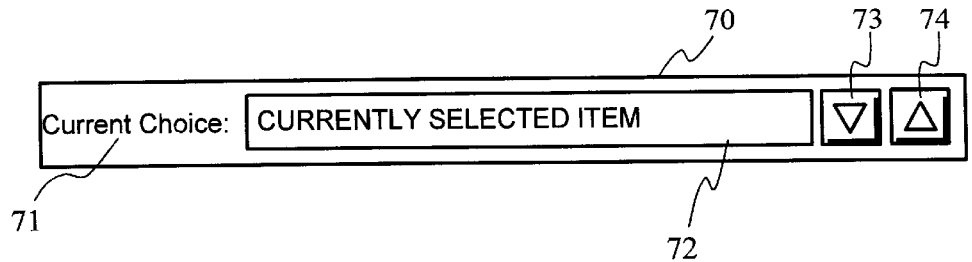
FIG. 7 depicts the new control in its normal or idle state.

The invention provides a spinner or spin-list button similar to conventional spin buttons except it provides a drop-down list of options (a postview list) and a new pop-up list of options (a preview list). FIG. 7 shows the normal or idle state of the new preview/postview spinner (70), with a dialog box (72) showing the current selection, a label (71) which indicates the topic or parameter being controlled, and a backward (73) and forward (74) button.

Figure 8:
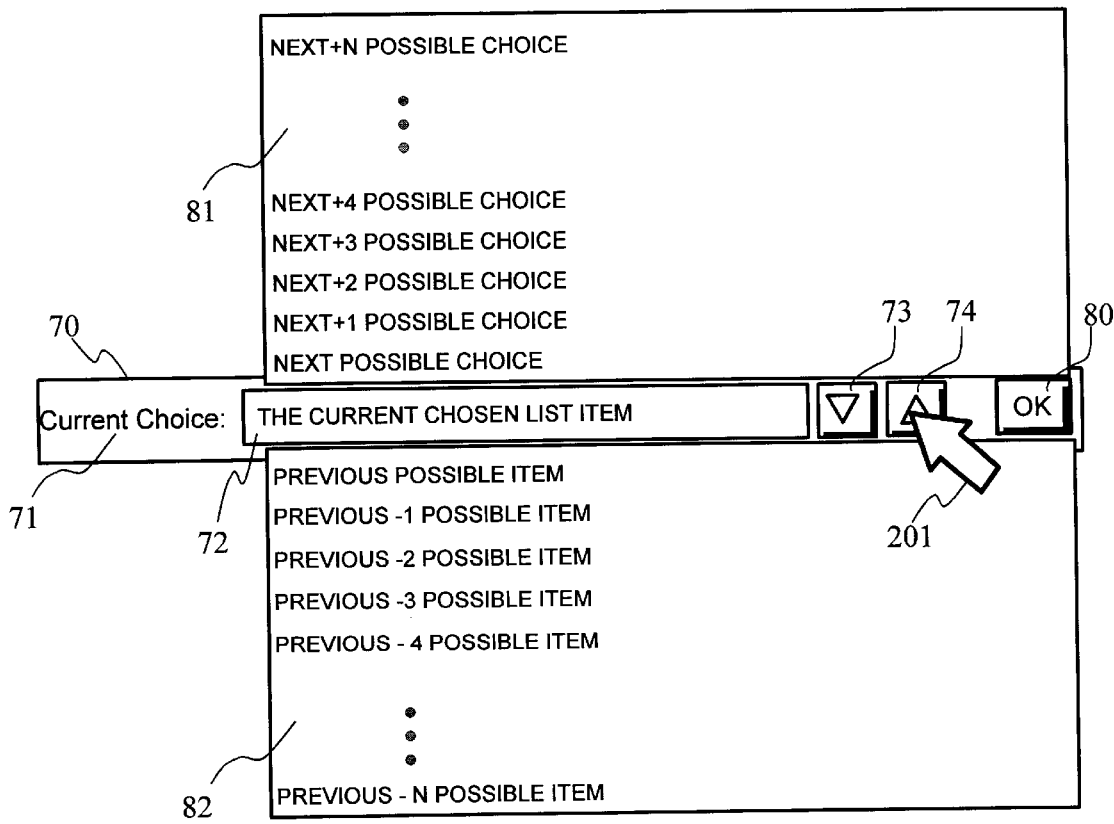
FIG. 8 shows the new control with its preview and postview lists displayed, and a selection finalization button.

FIG. 8 shows the new control in its activated state, preferably whenever the pointer (201) is moved over the forward (74) of backward (73) buttons, but alternatively when either button has been selected. In its activated state, the control display is updated to show two lists, one a convention drop-down postview list (82), the other a pop-up preview list (81). Also, according to an embodiment, an "OK" or "SELECT" button (80) (or conversely a "CANCEL" button) may be added to the control display. The user can view the possible selections from the list in two directions, up and down (or forward and backward, depending on the context of the topic of the control). For example, if this control were implemented on the URL or address dialog of a web browser, the dialog box may contain the current URL to which the browser is pointed, the postview list may contain a sorted list of URL's previously visited, and the preview list may contain a list of URL's visited after the current URL. This would be useful for navigating back and forth in the history list of URL's visited during a particular browser session. In another example of workflow automation which consists of several steps, the preview list may contain the list of steps already completed, the dialog box may contain the name of the step being completed, and the preview list may contain the list of steps to be completed sometime in the future. This could be useful for navigating interview-style computer-aided workflow, such as the interview-style "wizards" found commonly in tax programs (i.e. Intuit's Turbo Tax), presentation programs (i.e. Microsoft's Power Point), and word processors.

The user can place the pointer over the forward button (74) and select it, such as by clicking the mouse, and the list will scroll such that the next possible choice is moved down into the dialog box next to the label. Continuing to select the forward button causes the list to continue to scroll in this direction, until the forward button is no longer selected. In the preferred embodiment, the rate of scrolling is variable and accelerates when the button is selected and held for a period of time. When the user has moved the desired item into the dialog box, he or she may finalize the selection using one of several common methods, including double-clicking the control or moving the pointer to the item when it appears on one of the lists and selecting it. In one optional embodiment, selection finalization may be made by use of an optional "OK" button. In another alternate embodiment, final selection may be considered made if the user moves the pointer away from the control. Either option may be implemented as appropriate to the topic or nature of the system function or program parameter being controlled.

Likewise, the user may move the pointer over the backward button (73) to cause the list to scroll in the opposite direction towards the items in the postview list (82), and when the desired list item is in the dialog box, he or she may select the OK button (80) to finalize the choice. In one embodiment, the user may simply move the pointer away from either control button to cause the control to return to its normal or idle state, to abort changing of the system function or program parameter. In another embodiment, a "CANCEL" button may be provided with or in place of the "OK" button. Either embodiment may be implemented as appropriate to the topic or nature of the system function or program parameter being controlled.

Figure 9:
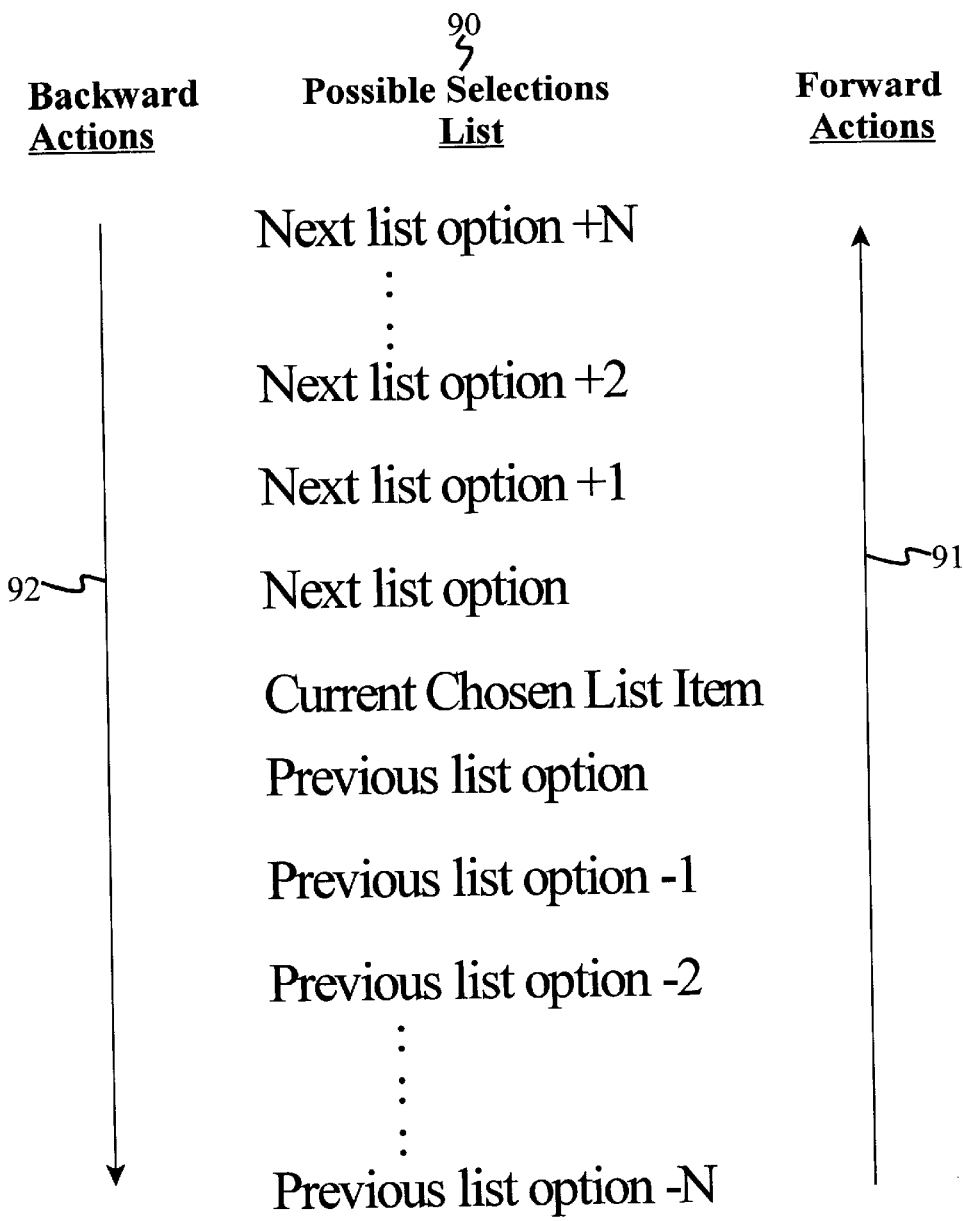
FIG. 9 graphically illustrates the action of scrolling through the list choices.

Turning to FIG. 9, the action of the list (90) scrolling is illustrated, both in the backwards (92) and the forwards (91) directions. In this view, the total list of possible choices can be viewed as the current choice appended to the preview and postview lists. In the preferred embodiment, the lists "wrap" around to each other instead of stopping at the last item on each list, thereby creating a virtual circular list as was described in the related patent application. However, this wrap-around action may not be necessary or appropriate for all topics for which the control may be used. Also, the backward and forward buttons may be replaced with a spinner control knob or infinite spinner control knob, as is described in the related application.

Figure 10:
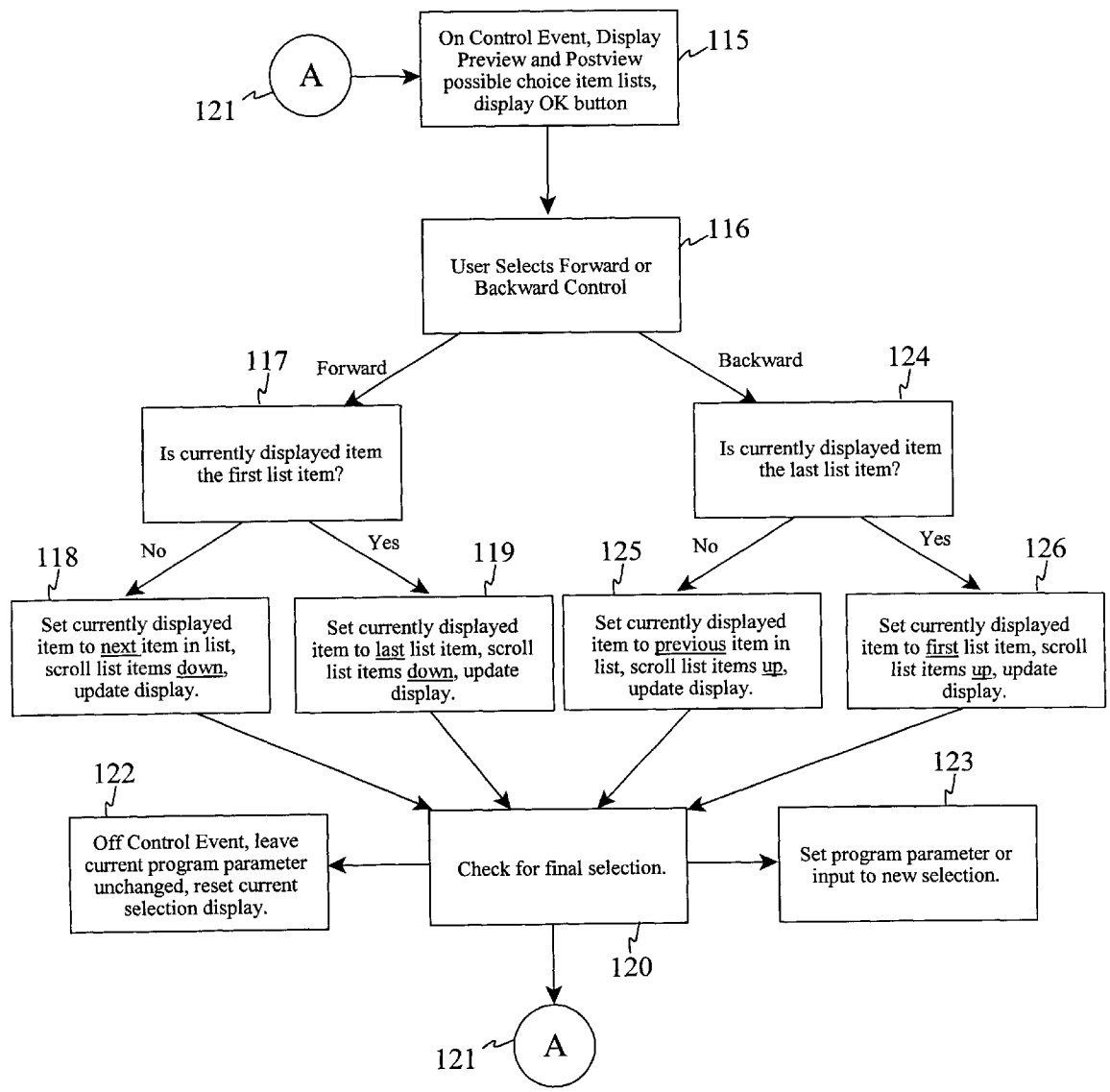
FIG. 10 sets forth the logical flow of the control processing.

In FIG. 10, the logical flow of the new control is depicted in a manner conductive to implementation of the GUI control in a wide variety of programming languages and methodologies, such as ('++ Sun Microsystems' Java. In the preferred embodiment, the operating system monitors the position of the pointer, and when it is near the control's forward and backwards buttons, the software for the control is executed (115) or fired. Initially, the control is immediately expanded to display the preview and postview lists and, optionally, to show the "OK" and/or "CANCEL" button(s). Then, the control waits for the user to select, such as click on, a forward or backward button (116). There will typically be a short delay at this point due to the user needing time to scan the lists of choices and decide which way to scroll. When the forward button is detected, a check is made to see if the preview list has reached its end (118), and if so, the lists are "wrapped", and the display is updated. Otherwise, if the end of the preview list has not been reached, the list is scrolled downward (119), moving the next possible choice from the preview list into the dialog box, and the display is updated.

Next, a check is made to determine if a final selection has been made. If a final selection has been made, the system function or program parameter related to the topic is updated (123), and the control is returned to its normal mode by removing the preview and postview lists (and OK/CANCEL buttons) from the display.

If the pointer is detected as having been moved away from the forwards or backwards buttons (122), the change of the system function or program parameter may be automatically aborted or accepted, depending on implementation choice as appropriate to the topic being controlled. Finally, the display is returned to its normal mode with the currently displayed choice unchanged (if aborted) or changed (if selection is finalized). However, if the printer is still in the vicinity of the forward and backward buttons, the control software processes the next scroll step (121).

Likewise, selection of the backward button causes a check (124) to be made for having reached the end of the postview list, in order to "wrap" (125) the list around to the preview list or continue scrolling upward (126).

In the preferred embodiment, a timer is set to determine if either the forward or backward button has been selected for a predetermined amount of time ("clicked and held"), after which time the processing of the scrolling is accelerated to provide quicker movement through the lists.

It will be understood from the foregoing description that various modifications and changes may be made in the preferred embodiment of the present invention without departing from its true spirit, such as the use of alternate programming methodologies or languages, alternate computer platforms and software, operating systems and user control objects. It is intended that this description is for purposes of illustration only and should not be construed in a limiting sense. The scope of this invention should be limited only by the language of the following claims.

What is claimed is:

1. A method for interfacing with a user of a computer system having a graphical user display, said graphical user display having a pointer element on the graphical user display with a user pointer controller, the pointer controller having position and selection status responsive to operation by a user, the method comprising the steps of:

displaying on said graphical user display in a static position a spinner control having one or more action areas, a topic label area and a current selection dialog box;

responsive to movement of said pointer element to a position near one of said action areas, altering the appearance of said spinner control to change said dialog box to display an item in sequence from a list of possible selections, and to display a pop-up preview list and a drop-down postview list adjacent to and on opposing sides of said static position of the dialog box, each of said preview and postview lists displaying a plurality of possible selection items in a sequential order;

responsive to selection of an action area, further modifying the spinner control appearance to provide scrolling through said sequentially ordered list such that a currently selectable item is moved from the preview list or the postview list to the statically positioned selection dialog box, and the item formerly shown in the current selection dialog box is moved to the preview or postview list, according to a direction of scrolling indicated by said selected action area such that the user may operate the spinner control to review items from the list of possible selections in two directions, one towards the preview list and one towards the postview list; and responsive to final selection by said user, automatically generating a signal to said computer system indicative of the list item currently shown in the selection dialog box as being the user's desired input, and removing the pop-up preview list and drop-down post view list from the display to return to said non-activated state.

2. The method of claim 1, further comprising the step of allowing continued viewing of said list of possible selections displayed in said current selection dialog area and said preview and postview lists such that when a finite end of a postview or preview list is reached, the list of possible selection items is wrapped to the first or last item in the list, thereby forming an endless circular list of possible options.

3. The method of claim 1, wherein said action areas comprise a forward action area.

4. The method of claim 3, wherein said forward action area is presented as a virtual push button.

5. The method of claim 1, wherein said action areas comprise a backward action area.

6. The method of claim 5, wherein said backward action area is presented as a virtual push button.

7. The method of claim 1, wherein said action areas comprise a free-spinning virtual control knob.

8. A computer-readable storage medium having stored therein program code for interfacing with a user of a computer system, the computer system having a graphical user display and a processor, said graphical user display having a pointer element on the graphical user display with a user pointer controller, the pointer controller having position and selection status responsive to operation by a user, wherein the program code performs the steps of:

displaying on said graphical user display in a static position a spinner control having one or more action areas, a topic label area and a current selection dialog box in which a user may type an input;

responsive to movement of said pointer element to a position near one of said action areas, altering the appearance of said spinner control to change said dialog box to display an item in sequence from a list of possible selections, and to display a pop-up preview list and a drop-down postview list adjacent to and on opposing sides of said static position of the dialog box, each of said preview and postview lists displaying a plurality of possible selection items in a sequential order;

responsive to selection of an action area, further modifying the spinner control appearance to provide scrolling through said sequentially ordered list such that a currently selectable item is moved from the preview list or the postview list to the statically positioned selection dialog box, and the item formerly shown in the current selection dialog box is moved to the preview or postview list, according to a direction of scrolling indicated by said selected action area such that the user may operate the spinner control to review items from the list of possible selections in two directions, one towards the preview list and one towards the postview list; and responsive to final selection by said user, automatically generating a signal to said computer system indicative of the list item currently shown in the selection dialog box as being the user's desired input, and removing the pop-up preview list and drop-down post view list from the display to return to said non-activated state.

9. The computer-readable storage medium of claim 8 wherein the steps performed by the program code further comprise the step of allowing continued viewing of said list of possible selections displayed in said current selection dialog area and said preview and postview lists such that when a finite end of a postview or preview list is reached, the list of possible selection items is wrapped to the first or last item in the list, thereby forming an endless circular list of possible options.

10. The computer-readable storage medium of claim 8, wherein said action areas comprise a forward action area.

11. The computer-readable storage medium of claim 10, wherein said forward action area is presented as a virtual push button.

12. The computer-readable storage medium of claim 8, wherein said action areas comprise a backward action area.

13. The computer-readable storage medium of claim 12, wherein said backward action area is presented as a virtual push button.

14. The computer-readable storage medium of claim 8, wherein said action areas comprise a free-spinning virtual control knob.

15. A computer system for interfacing with a user, comprising:
- a spinner control displayed on a graphical user display, said spinner control having one or more action areas, a topic label area and a statically positioned current selection dialog box in an idle state;
- a user-operable pointer and action area selection controller;
- a spinner controller configured as follows:
  - (i) to display a pop-up preview list and a drop-down postview list adjacent to and on opposing sides of said current selection dialog box upon movement of said pointer to a position near said action area, said preview and postview lists displaying a plurality of possible selection items,
  - (ii) to responsive to selection of an action area, to scroll through said sequentially ordered list such that a currently selectable item is moved from the preview list or the postview list to the statically positioned selection dialog area and the item formerly shown in the current selection dialog area is moved to the preview or postview list, according to a direction of scrolling indicated by said selected action area, and
  - (iii) responsive to final selection of an item displayed in the dialog area, to remove said preview and postview list from the display returning the spinner control to an idle state by removing said preview and postview lists from display; and
- a signal generator for signaling said computer system indicating said final selection.

16. The computer system of claim 15, wherein said action areas comprise a forward action area.

17. The computer system of claim 16, wherein said forward action area is presented as a virtual push button.

18. The computer system of claim 15, wherein said action areas comprise a backward action area.

19. The computer system of claim 18, wherein said backward action area is presented as a virtual push button.

20. The computer system of claim 15, wherein said action areas comprise a free-spinning virtual control knob.

* * * * *